United States Patent
Shen et al.

(10) Patent No.: US 9,501,116 B2
(45) Date of Patent: Nov. 22, 2016

(54) POWER INTEGRATED DEVICE AND POWER CONTROL METHOD THEREOF

(71) Applicant: Wistron NeWeb Corp., Hsinchu (TW)

(72) Inventors: Min-Hung Shen, Hsinchu (TW);
Kuo-Chao Yen, Hsinchu (TW);
Mei-Chi Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 115 days.

(21) Appl. No.: 14/226,255

(22) Filed: Mar. 26, 2014

(65) Prior Publication Data

US 2015/0123477 A1 May 7, 2015

(30) Foreign Application Priority Data

Nov. 1, 2013 (TW) .............................. 102139707 A

(51) Int. Cl.
*G06F 1/26* (2006.01)
*H02J 4/00* (2006.01)

(52) U.S. Cl.
CPC .................. *G06F 1/26* (2013.01); *G06F 1/266* (2013.01); *Y10T 307/549* (2015.04)

(58) Field of Classification Search
None
See application file for complete search history.

(56) References Cited

U.S. PATENT DOCUMENTS

| 2004/0169072 | A1* | 9/2004 | Peng | ........................ | G06K 9/20 |
| | | | | | 235/375 |
| 2006/0112288 | A1* | 5/2006 | Schindler | ................ | G06F 1/266 |
| | | | | | 713/300 |

* cited by examiner

*Primary Examiner* — Rexford Barnie
*Assistant Examiner* — Swarna N Chowdhuri
(74) *Attorney, Agent, or Firm* — Muncy, Geissler, Olds & Lowe, P.C.

(57) ABSTRACT

The present invention provides a power integrated device including a detection circuit and a determination circuit. The detection circuit detects whether first and second connection ports are coupled to a power source and produce first and second valid signals, respectively, and detect whether the power source coupled to the first and second connection ports meet first or second predetermined power values and produce first and second power spec signals, respectively. The determination circuit produces a system power-control signal according to the first valid signal, the second valid signal, the first power spec signal and the second power spec signal to turn on or turn off the power integrated device.

14 Claims, 10 Drawing Sheets

POWER INTEGRATED DEVICE AND POWER CONTROL METHOD THEREOF

CROSS REFERENCE TO RELATED APPLICATIONS

This Application claims priority of Taiwan Patent Application No. 102139707, filed on Nov. 1, 2013, the entirety of which is incorporated by reference herein.

BACKGROUND OF THE INVENTION

Field of the Invention

The present invention is related to a power integrated device; and in particular to a power integrated device capable of controlling power supply according to the connecting power source.

Description of the Related Art

In recent years, electronic devices have become much more higher-end and functions have also increased in variety. For example, notebooks, cellphones, tablets and other handheld devices can have telecommunication capabilities, receiving and sending out emails, maintaining social networks, managing contacts, media playback, and many other function and applications. Due to the variety of functions these devices may have, the demand for varying power sources have thus increased also. Most external devices also require a separate power source for operation.

That is why the effective use of power sources provided to electronic devices is such a problem.

BRIEF SUMMARY OF THE INVENTION

A detailed description is given in the following embodiments with reference to the accompanying drawings.

The present invention provides a power integrated device including a first connection port, a second connection port, a detection circuit and a determination circuit. The detection circuit is arranged to detect whether the first connection port and the second connection port are coupled to a power source and produce a first valid signal and a second valid signal, respectively, and detect whether the power source coupled to the first connection port meets a first predetermined power value or a second predetermined power value and whether the power source coupled to the second connection port meets the first predetermined power value or the second predetermined power value and produce a first power spec signal and a second power spec signal, respectively, wherein the first predetermined power value is greater than the second predetermined power value. The determination circuit is arranged to produce a system power-control signal according to the first valid signal, the second valid signal, the first power spec signal and the second power spec signal to turn on or turn off the power integrated device.

The present invention further provides a power source control method, applied to a power integrated device comprising a first connection port and a second connection port. The power source control method includes detecting whether the first connection port is coupled to any power source and producing a first valid signal, accordingly; detecting whether the second connection port is coupled to any power source and producing a second valid signal, accordingly; detecting whether the power source coupled to the first connection port meets a first predetermined power value or a second predetermined power value and producing a first power spec signal, accordingly, wherein the first predetermined power value is greater than the second predetermined power value; detecting whether the power source coupled to the second connection port meets the first predetermined power value or the second predetermined power value and producing a second power spec signal, accordingly; and producing a system power-control signal according to the first valid signal, the second valid signal, the first power spec signal and the second power spec signal for turning on or turning off the power integrated device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
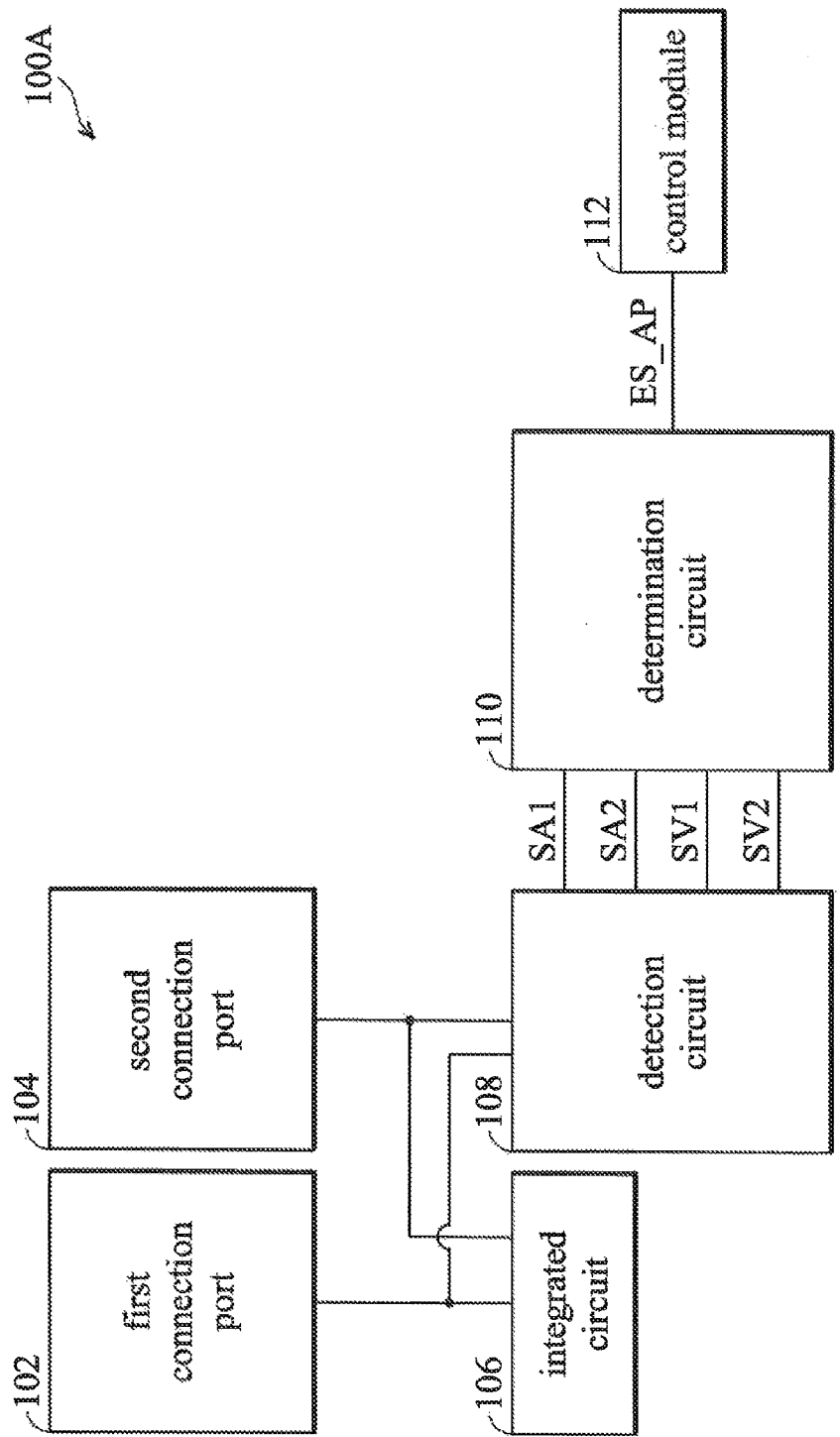
FIG. 1 is a schematic diagram illustrating an embodiment of a power integrated device of the present invention.

FIG. 1 is a schematic diagram illustrating an embodiment of a power integrated device of the present invention. The power integrated device 100A includes a first connection port 102, a second connection port 104, an integrated circuit 106, a detection circuit 108, a determination circuit 110 and a control module 112. The first connection port 102 and the second connection port 104 are arranged to be coupled to a power source, respectively. The power integrated device 100A is arranged to receive one power source or two power sources, and enable the elements according to the sum of the received power source(s).

The integrated circuit 106 is arranged to integrate the received power sources. For example, when the first connection port 102 is coupled to a power source and the second connection port 104 is coupled to another power source, the integrated circuit 106 integrates the power sources received form the first connection port 102 and the second connection port 104, and produces an integrated power source for providing power to the elements.

The detection circuit 108 is arranged to detect whether the first connection port 102 is coupled to any power source and produce a first valid signal SV1, accordingly. Furthermore, the detection circuit 108 is arranged to detect whether the second connection port 104 is coupled to any power source power source and produce a second valid signal SV2, accordingly. It should be noted that the first valid signal SV1 has a high level and a low level, and the second valid signal SV2 also has a high level and a low level. For example, when the first connection port 102 is coupled to a power source, the detection circuit 108 produces the first valid signal SV1 with a high level according to the signal received from the power source. When the first connection port 102 is not coupled to any power source, the detection circuit 108 produces the first valid signal SV1 with a low level. Similarly, when the second connection port 104 is coupled to a power source, the detection circuit 108 produces the second valid signal SV2 with high level according to the signal received from the power source. When the second connection port 104 is not coupled to any power source, the detection circuit 108 produces the second valid signal SV2 with low level. Moreover, the detection circuit 108 is further arranged to detect whether the power source coupled to the first connection port 102 meets a first predetermined power value or a second predetermined power value and whether the power source coupled to the second connection port 104 meets the first predetermined power value or the second predetermined power value and produce a first power spec signal SA1 and a second power spec signal SA2, respectively, wherein the first predetermined power value is greater than the second predetermined power value. For example, the detection circuit 108 produces the first power spec signal SA1 with high level according to the received power source when the first connection port 102 is coupled to the power source meeting the first predetermined power value, and produces the first power spec signal SA1 with low level according to the received power source when the first connection port 102 is coupled to the power source meeting the second predetermined power value. Furthermore, the detection circuit 108 produces the second power spec signal SA2 with high level according to the received power source when second connection port 104 is coupled to the power source meeting the first predetermined power value, and produces the second power spec signal SA2 with low level according to the received power source when the second connection port 104 is coupled to the power source meeting the second predetermined power value.

The determination circuit 110 is arranged to produce a system power-control signal ES_AP according to the first valid signal SV1, the second valid signal SV2, the first power spec signal SA1 and the second power spec signal SA2 to turn on or turn off the power integrated device 100A. It should be noted that the system power-control signal ES_AP has a high level and a low level. When the first connection port 102 and the second connection port 104 are both coupled to the power sources meeting the first predetermined power value, the determination circuit 110 produces a system power-control signal ES_AP with high level for turning on the power integrated device 100A. When either one of the first connection port 102 or the second connection port 104 is coupled to the power source meeting the first predetermined power value and the first connection port 102 or the second connection port 104 that is remaining is not coupled to any power sources, the determination circuit 110 produce the system power-control signal ES_AP with high level for turning on the power integrated device 100A. When the first connection port 102 and the second connection port 104 are both coupled to the power sources meeting the second predetermined power value, the determination circuit 110 produces the system power-control signal ES_AP with high level for turning on the power integrated device 100A. When either one of the first connection port 102 or the second connection port 104 is coupled to the power source meeting the second predetermined power value and the first connection port 102 or the second connection port 104 that is remaining is not coupled to any power sources, the determination circuit 110 produces the system power-control signal ES_AP with low level for turning off the power integrated device 100A. When either one of the first connection port 102 or the second connection port 104 is coupled to the power source meeting the first predetermined power value and the first connection port 102 or the second connection port 104 that is remaining is coupled to the power source meeting the second predetermined power value, the determination circuit 110 produces the system power-control signal ES_AP with high level for turning on the power integrated device 100A.

The control module 112 is arranged to turn on or turn off the power integrated device 100A according to the system power-control signal ES_AP. For example, the control module 112 may be implemented on a CPU (not shown) of the power integrated device 100A or a power source chipset, but it is not limited thereto. It should be noted that when the system power-control signal ES_AP is at a high level, the control module 112 turns on the power integrated device 100A or keep turning on the power integrated device 100A. When the system power-control signal ES_AP is at a low level, the control module 112 turns off the power integrated device 100A.

It should be noted that, in one of the embodiments, the power integrated device 100A is a POE Access Point (AP) having two POE sockets (first connection port 102 and second connection port 104), but it is not limited thereto. Moreover, the first connection port 102 and the second connection port 104 are capable of coupling to the power sources meeting the specification of 802.3 AT or 802.3 AF, wherein the power source of 802.3 AT is 25.5 (W), and the power source of 802.3 AF is 12.75 (W). Namely, in this embodiment, the first predetermined power value is 25.5 watt, and the second predetermined power value is 12.75 watt, but it is not limited thereto.

Figure 2:
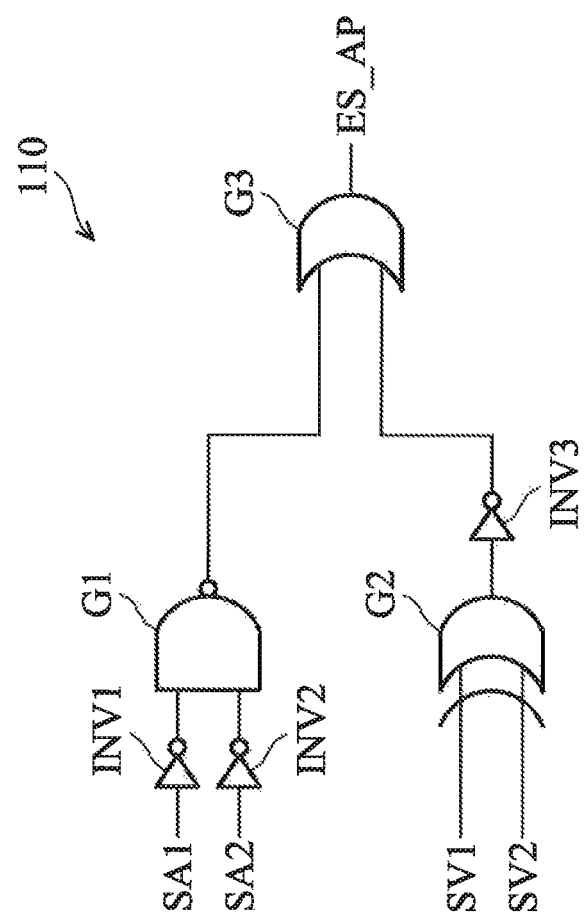
FIG. 2 is a schematic diagram illustrating an embodiment of a determination circuit of the present invention.

FIG. 2 is a schematic diagram illustrating an embodiment of a determination circuit 110 of the power integrated device 100A shown in FIG. 1 of the present invention. In this embodiment, the determination circuit 110 includes a first inverter INV1, a second inverter INV2, a NAND gate G1, a XOR gate G2, a third inverter INV3 and a first OR gate G3. The first inverter INV1 has an input terminal arranged to receive the first power spec signal SA1, and an output terminal coupled to the first input terminal of the NAND gate G1. The second inverter INV2 has an input terminal arranged to receive the second power spec signal SA2 and an output terminal coupled to the second input terminal of the NAND gate G1. The NAND gate G1 has a first input terminal coupled to the output terminal of the first inverter INV1, a second input terminal coupled to the output terminal of the second inverter INV2, and an output terminal coupled to the first input terminal of the first OR gate G3. The XOR gate G2 has a first input terminal arranged to receive the first valid signal SV1, a second input terminal arranged to receive the second valid signal SV2 and an output terminal coupled to the input terminal of the third inverter INV3. The third inverter INV3 has an input terminal coupled to the output terminal of the XOR gate G2 and an output terminal coupled to the second input terminal of the first OR gate G3. The first OR gate G3 has a first input terminal coupled to the output terminal of the NAND gate G1, a second input terminal coupled to the output terminal of the third inverter INV3, and an output terminal arranged to produce the system power-control signal ES_AP.

Figure 3:
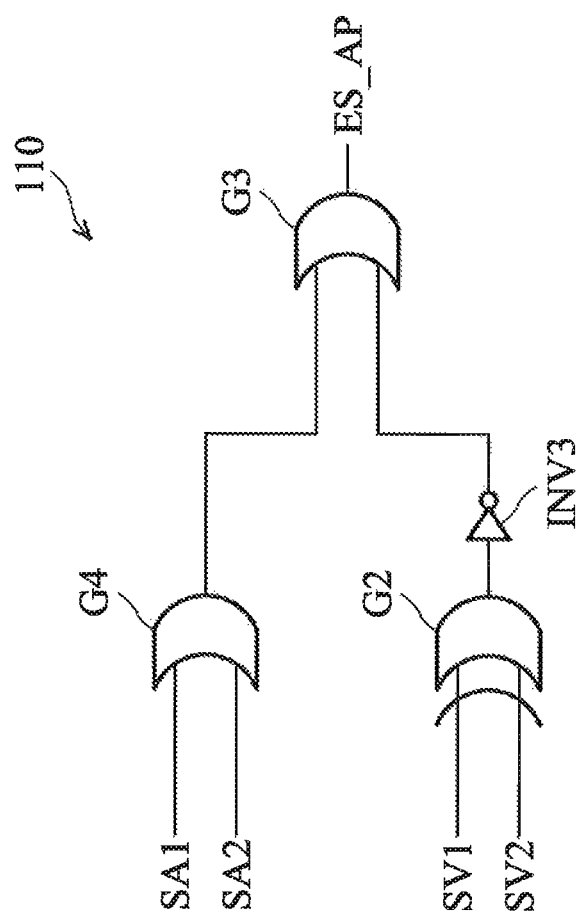
FIG. 3 is a schematic diagram illustrating another embodiment of the determination circuit of the present invention.

FIG. 3 is a schematic diagram illustrating another embodiment of the determination circuit 110 of the power integrated device 100A shown in FIG. 1 of the present invention. In this embodiment, the determination circuit 110 of FIG. 3 is similar to the determination circuit 110 of FIG. 2, except that the first inverter INV1, the second inverter INV2 and the NAND gate G1 is replaced by a second OR gate G4 in FIG. 3. The second OR gate G4 has a first input terminal arranged to receive the first power spec signal SA1, a second input terminal arranged to receive the second power spec signal SA2, and an output terminal coupled to the first input terminal of the first OR gate G3.

Figure 4:
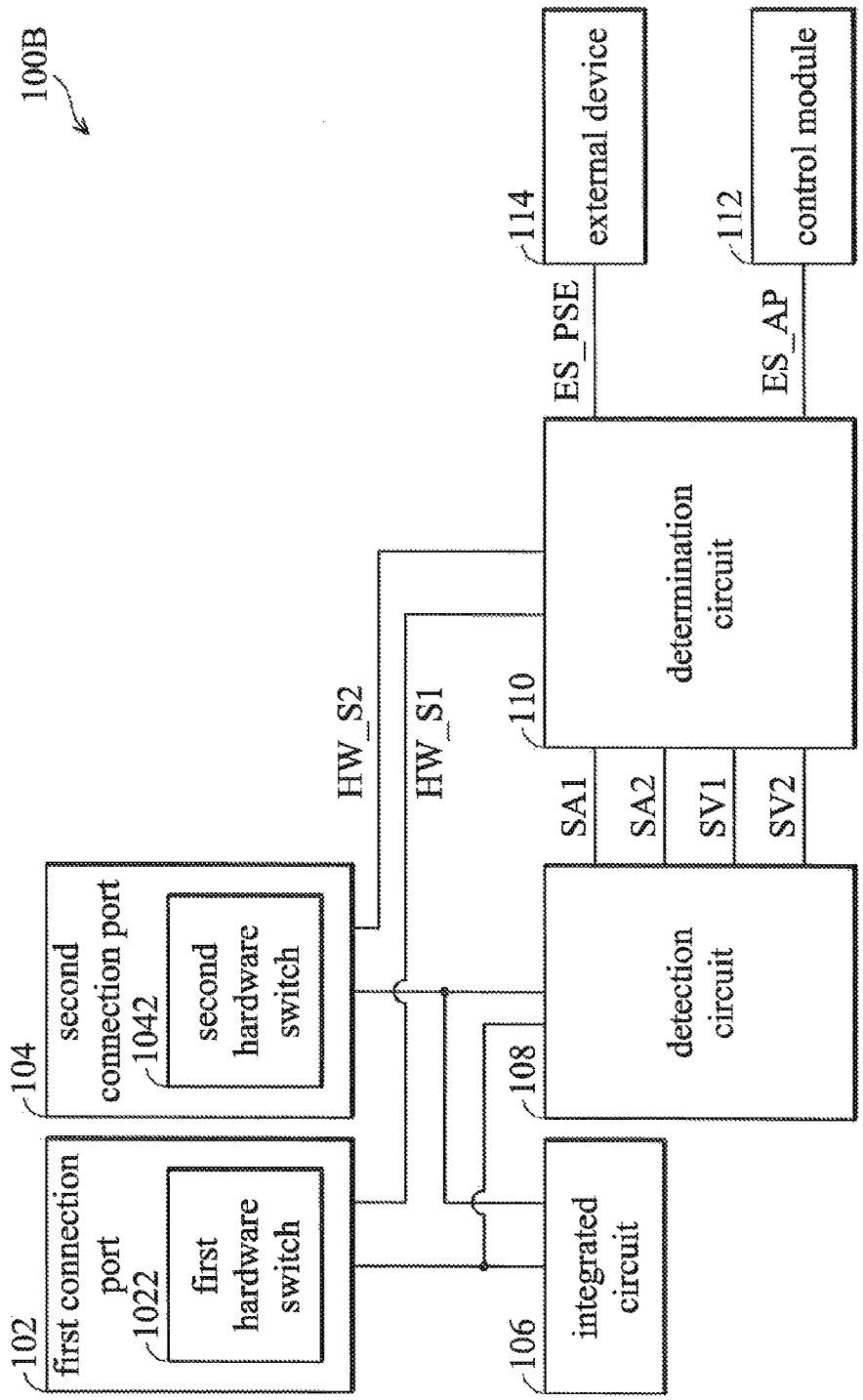
FIG. 4 is a schematic diagram illustrating another embodiment of the power integrated device of the present invention.

FIG. 4 is a schematic diagram illustrating another embodiment of the power integrated device of the present invention. The power integrated device 100B of FIG. 4 is similar to the power integrated device 100A of FIG. 1, except that the power integrated device 100B of FIG. 4 further includes a first hardware switch 1022, a second hardware switch 1042 and an external device 114. The first hardware switch 1022 of the first connection port 102 is arranged to detect whether the first connection port 102 is coupled to any power source and produce a first switch signal HW_S1, accordingly. The second hardware switch 1042 of the second connection port 104 is arranged to detect whether the second connection port 104 is coupled to any power source and produce a second switch signal HW_S2, accordingly. For example, the first hardware switch 1022 and the second hardware switch 1042 may be constituted by a metal tab and a resistor coupled between a high level and a ground, but it is not limited thereto. When the first connection port 102 is coupled to a power source, the metal tab of the first hardware switch 1022 couples a signal line to the ground through the resistor to produce the first switch signal HW_S1 with low level. When the first connection port 102 is not coupled to any power sources, the metal tab of the first hardware switch 1022 couples the signal line to the high level through the resistor to produce the first switch signal HW_S1 with high level. When the second connection port 104 is coupled to a power source, the metal tab of the second hardware switch 1042 couples a signal line to the ground through the resistor to produce the second switch signal HW_S2 with low level. When the second connection port 104 is not coupled to any power sources, the metal tab of the second hardware switch 1042 couples the signal line to the high level through the resistor to produce the second switch signal HW_S2 with high level.

In the embodiment of FIG. 4, the determination circuit 110 is arranged to produce an external power-control signal ES_PSE according to the first valid signal SV1, the second valid signal SV2, the first power spec signal SA1, the second power spec signal SA2, the first switch signal HW_S1 and the second switch signal HW_S2 for turning on or off an external device 114. Specifically, when the first connection port 102 and the second connection port 104 are both coupled to the power sources meeting the first predetermined power value, the determination circuit 110 produces the external power-control signal ES_PSE with high level for turning on the external device 114. When either one of the first connection port 102 or the second connection port 104 is coupled to the power source meeting the first predetermined power value and the first connection port 102 or the second connection port 104 that is remaining is not coupled to any power sources, the determination circuit 110 produces the external power-control signal ES_PSE with low level for turning off the external device 114. When the first connection port 102 and the second connection port 104 are both coupled to the power sources meeting the second predetermined power value, the determination circuit 110 produces the external power-control signal ES_PSE with low level for turning off the external device 114. When either one of the first connection port 102 or the second connection port 104 is coupled to the power source meeting the second predetermined power value or the first connection port 102 and the second connection port 104 that is remaining is not coupled to any power sources, the determination circuit 110 produces the external power-control signal ES_PSE with low level for turning off the external device 114. It should be noted that the power integrated device 100B is off when either one of the first connection port 102 or the second connection port 104 is coupled to the power source meeting the second predetermined power value and the first connection port 102 or the second connection port 104 that is remaining is not coupled to any power source except that the user removes one power source and there remains only one power source meeting the second predetermined power value in the situation of both of the first connection port 102 and the second connection port 104 are coupled to the power sources meeting the second predetermined power value or either one of the first connection port 102 or the situation of the second connection port 104 is coupled to the power source meeting the first predetermined power value and the first connection port 102 or the second connection port 104 that is remaining is coupled to the power source meeting the second predetermined power value. Moreover, in another embodiment, when either of the first connection port 102 or the second connection port 104 is coupled to the power source meeting the second predetermined power value and the first connection port 102 or the second connection port 104 that is remaining is not coupled to any power sources, the determination circuit 110 only produces the system power-control signal ES_AP with low level to turn off the power integrated device 100B. When either one of the first connection port 102 or the second connection port 104 is coupled to the power source meeting the first predetermined power value and the first connection port 102 or the second connection port 104 that is remaining is coupled to the power source meeting the second predetermined power value, the determination circuit 110 produces the external power-control signal ES_PSE with high level for turning on the external device 114.

Figure 5:
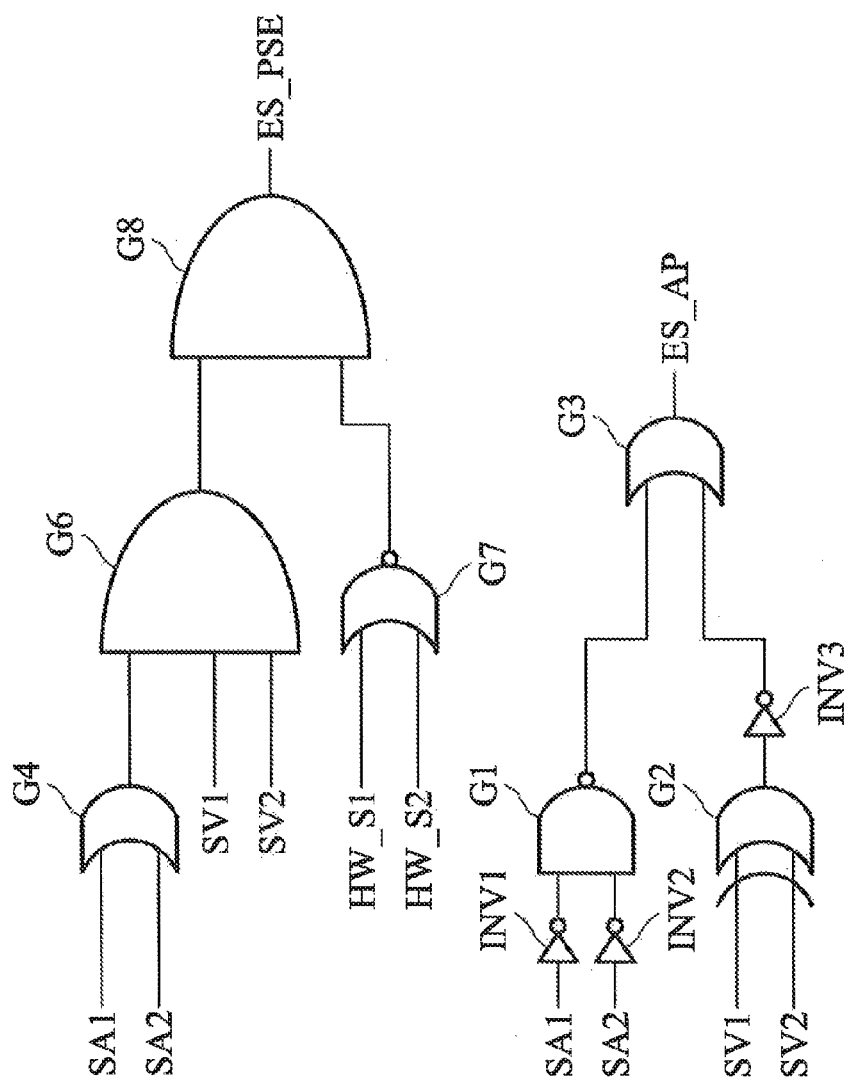
FIG. 5 is a schematic diagram illustrating another embodiment of the determination circuit of the present invention.

FIG. 5 is a schematic diagram illustrating another embodiment of the determination circuit of the power integrated device 100B shown in FIG. 5 of the present invention. The determination circuit 110 of FIG. 5 is similar to the determination circuit 110 of FIG. 2, except that the determination circuit 110 of FIG. 5 further includes a second OR gate G4, a first AND gate G6, a NOR gate G7 and a second AND gate G8. The second OR gate G4 has a first output terminal arranged to receive the first power spec signal SA1, a second input terminal arranged to receive the second power spec signal SA2 and an output terminal coupled to the first input terminal of the first AND gate G6. The first AND gate G6 has a first input terminal coupled to the output terminal of the second OR gate G4, a second input terminal arranged to receive the first valid signal SV1, a third input terminal arranged to receive the second valid signal SV2 and an output terminal coupled to the first input terminal of the second AND gate G8. The NOR gate G7 has a first input terminal arranged to receive the first switch signal HW_S1, a second input terminal arranged to receive the second switch signal HW_S2, and an output terminal coupled to the second input terminal of the second AND gate G8. The second AND gate G8 has a first input terminal coupled to the output terminal of the first AND gate G6, a second input terminal coupled to the NOR gate G7, and an output terminal arranged to produce the external power-control signal ES_PSE.

Figure 6:
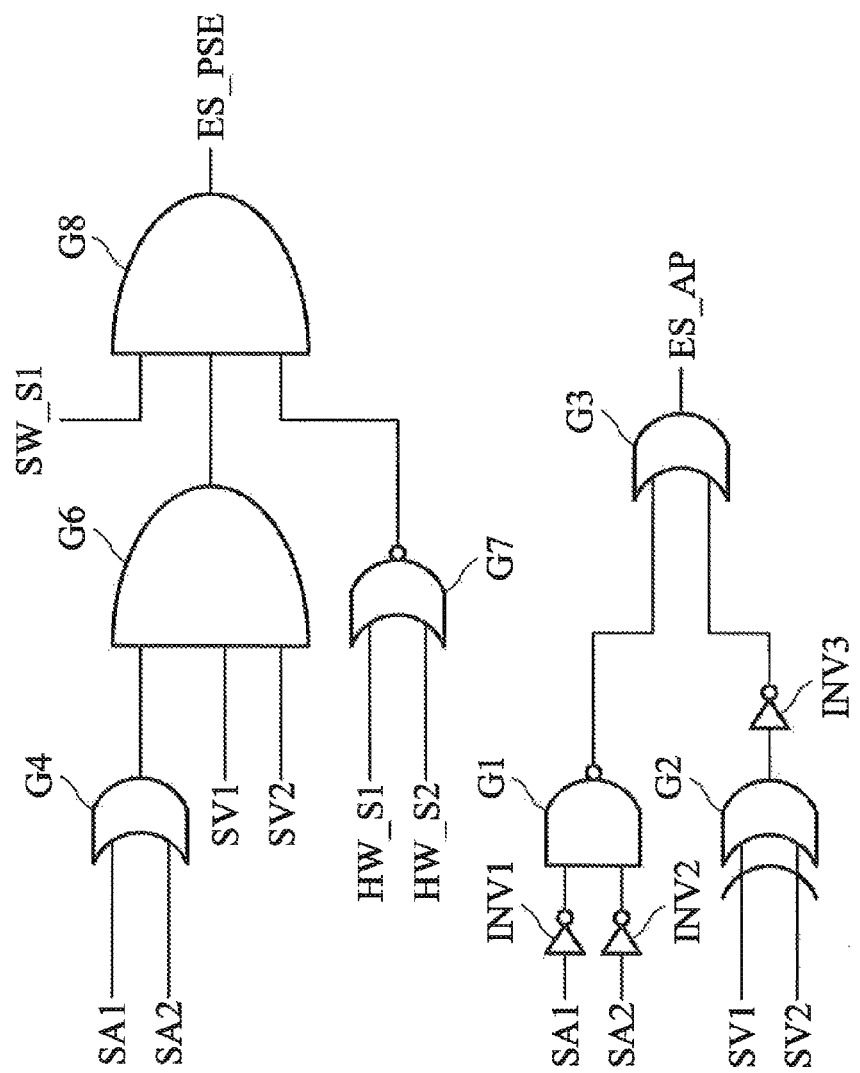
FIG. 6 is a schematic diagram illustrating another embodiment of another determination circuit of the present invention.

FIG. 6 is a schematic diagram illustrating another embodiment of another determination circuit of the power integrated device 100B shown in FIG. 4 of the present invention. The determination circuit 110 of FIG. 6 is similar to the determination circuit 110 of FIG. 5, except for the second AND gate G8. The second AND gate G8 of FIG. 6 further includes a third input terminal arranged to be coupled to a software control signal SW_S1. It should be noted that the software control signal SW_S1 may be produced by a CPU (not shown) of the power integrated device 100B or a power control chipset (not shown) according to some specific requirement, but it is not limited thereto.

Figure 7:
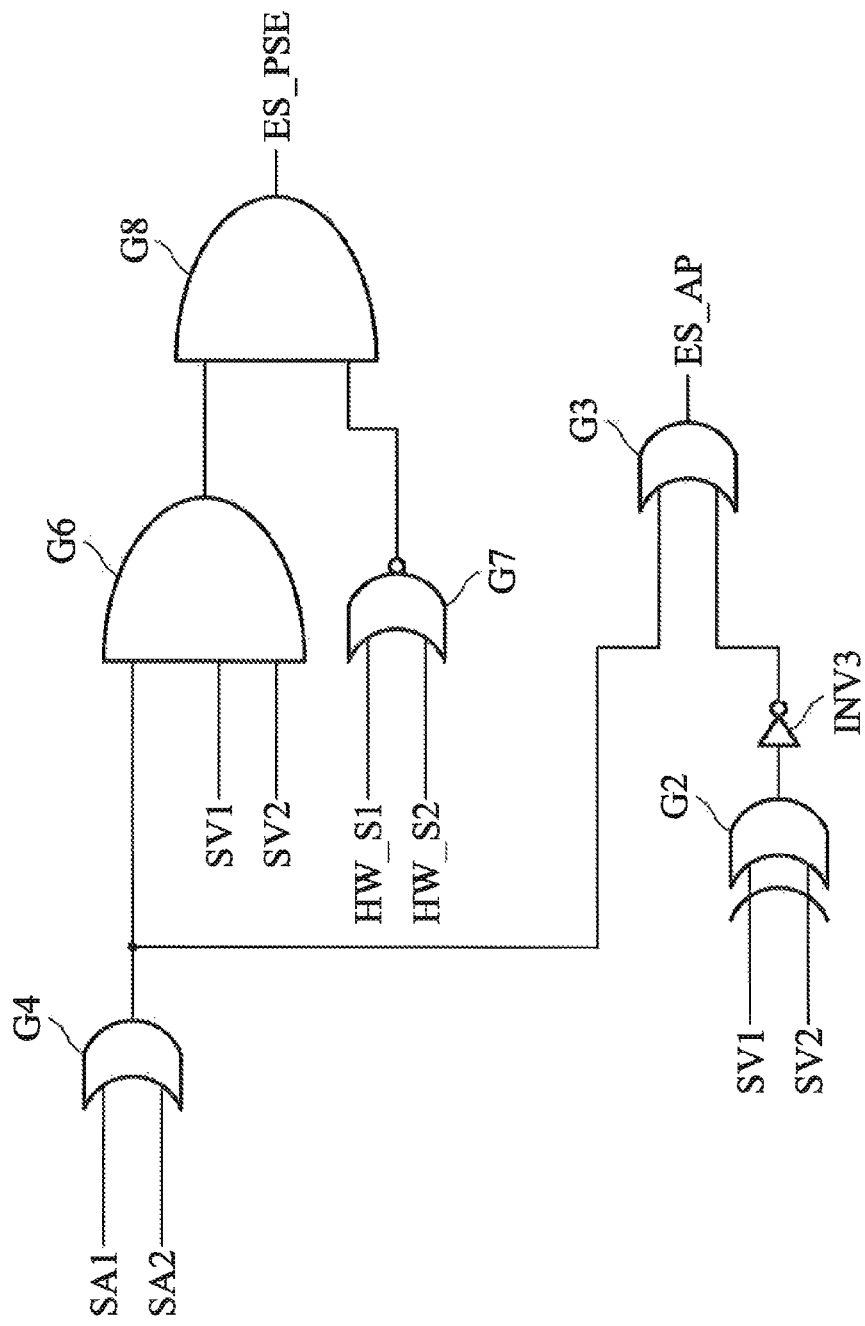
FIG. 7 is a schematic diagram illustrating another embodiment of the determination circuit of the present invention.

FIG. 7 is a schematic diagram illustrating another embodiment of the determination circuit of the power integrated device 100B shown in FIG. 4 the present invention. The determination circuit 110 of FIG. 7 is similar to the determination circuit 110 of FIG. 3, except that the determination circuit 110 of FIG. 7 further comprises a first AND gate G6, a NOR gate G7 and a second AND gate G8. It should be noted that the output terminal of the second OR gate G4 is further arranged to be coupled to the first input terminal of the first AND gate G6. The first AND gate G6 has a first input terminal coupled to the output terminal of the second OR gate G4, a second input terminal arranged to receive the first valid signal SV1, a third input terminal arranged to receive the second valid signal SV2, and an output terminal coupled to the first input terminal of the second AND gate G8. The NOR gate G07 has a first input terminal arranged to receive the first switch signal HW_S, a second input terminal arranged to receive the second switch signal HW_S2 and an output terminal coupled to the second input terminal of the second AND gate G8. The second AND gate G8 has a first input terminal coupled to the output terminal of the first AND gate G6, a second input terminal coupled to the NOR gate G7, and an output terminal arranged to produce the external power-control signal ES_PSE.

Figure 8:
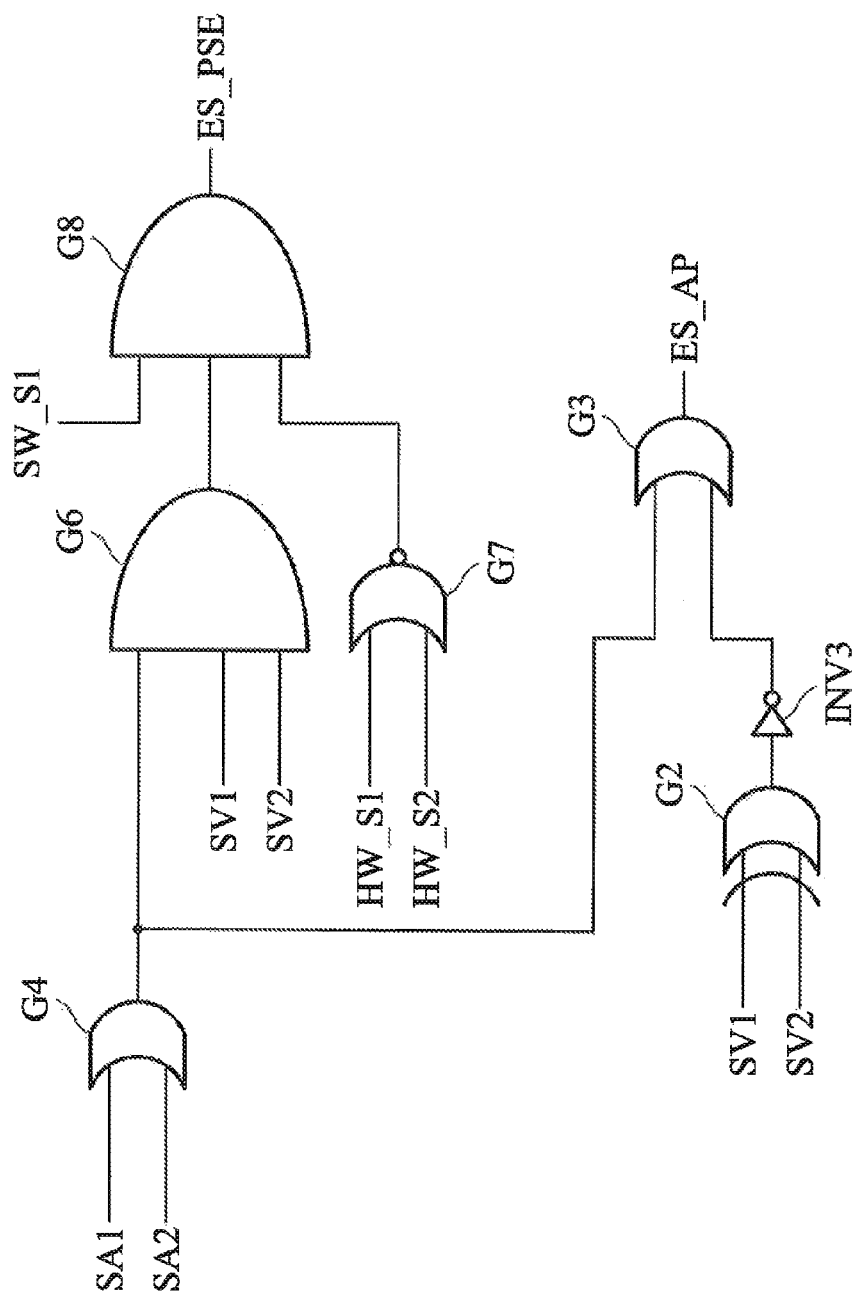
FIG. 8 is a schematic diagram illustrating another embodiment of the determination circuit of the present invention.

FIG. 8 is a schematic diagram illustrating another embodiment of the determination circuit of the power integrated device 100B shown in FIG. 4 the present invention. The determination circuit 110 of FIG. 8 is similar to the determination circuit 110 of FIG. 7, except for the second AND gate G8. The second AND gate G8 of FIG. 8 further includes a third input terminal coupled to a software control signal SW_S1. It should be noted that the software control signal SW_S1 may be produced by a CPU (not shown) of the power integrated device 100B or a power control chipset (not shown) according to some specific requirement, but it is not limited thereto.

Figure 9:
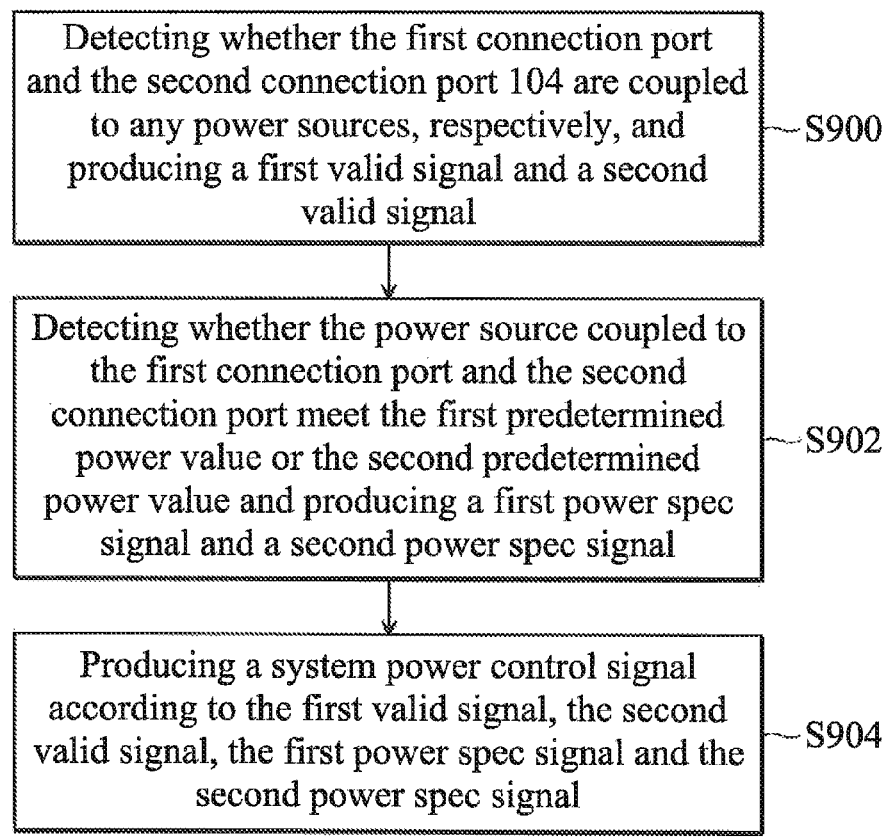
FIG. 9 is a flow chart illustrating an embodiment of a power source control method of the present invention.

FIG. 9 is a flow chart illustrating an embodiment of a power source control method of the present invention. The power source control method is applied to the power integrated device 100A. The process starts at step S900.

In step S900, the detection circuit 108 is arranged to detect whether the first connection port 102 and the second connection port 104 are(is) coupled to any power source(s), respectively and produce a first valid signal SV1 and a second valid signal SV2, accordingly. For example, when the first connection port 102 is coupled to a power source, the detection circuit 108 produces the first valid signal SV1 with high level according to the signal received from the power source. When the first connection port 102 is not coupled to any power source, the detection circuit 108 produces the first valid signal SV1 with low level. Similarly, when the second connection port 104 is coupled to a power source, the detection circuit 108 produces the second valid signal SV2 with high level according to the signal received from the power source. When the second connection port 104 is not coupled to any power source, the detection circuit 108 produces the second valid signal SV2 with low level.

Next, in step S902, the detection circuit 108 is further arranged to detect whether the power source coupled to the first connection port 102 meets a first predetermined power value or a second predetermined power value and whether the power source coupled to the second connection port 104 meets the first predetermined power value or the second predetermined power value and produce a first power spec signal SA1 and a second power spec signal SA2, respectively, wherein the first predetermined power value is greater than the second predetermined power value. For example, the detection circuit 108 produces the first power spec signal SA1 with high level according to the received power source when the first connection port 102 is coupled to the power source meeting the first predetermined power value, and produces the first power spec signal SA1 with low level according to the received power source when the first connection port 102 is coupled to the power source meeting the second predetermined power value. Furthermore, the detection circuit 108 produces the second power spec signal SA2 with high level according to the received power source when second connection port 104 is coupled to the power source meeting the first predetermined power value, and produces the second power spec signal SA2 with low level according to the received power source when the second connection port 104 is coupled to the power source meeting the second predetermined power value.

Next, in step S904, the determination circuit 110 is arranged to produce a system power-control signal ES_AP according to the first valid signal SV1, the second valid signal SV2, the first power spec signal SA1 and the second power spec signal SA2 to turn on or turn off the power integrated device 100A. It should be noted that the system power-control signal ES_AP has a high level and a low level. When the first connection port 102 and the second connection port 104 are both coupled to the power sources meeting the first predetermined power value, the determination circuit 110 produces a system power-control signal ES_AP with high level for turning on the power integrated device 100A. When either one of the first connection port 102 or the second connection port 104 is coupled to the power source meeting the first predetermined power value and the first connection port 102 or the second connection port 104 that is remaining is not coupled to any power sources, the determination circuit 110 produce the system power-control signal ES_AP with high level for turning on the power integrated device 100A. When the first connection port 102 and the second connection port 104 are both coupled to the power sources meeting the second predetermined power value, the determination circuit 110 produces the system power-control signal ES_AP with high level for turning on the power integrated device 100A. When either one of the first connection port 102 or the second connection port 104 is coupled to the power source meeting the second predetermined power value and the first connection port 102 or the second connection port 104 that is remaining is not coupled to any power sources, the determination circuit 110 produces the system power-control signal ES_AP with low level for turning off the power integrated device 100A. When either one of the first connection port 102 or the second connection port 104 is coupled to the power source meeting the first predetermined power value and the first connection port 102 or the second connection port 104 that is remaining is coupled to the power source meeting the second predetermined power value, the determination circuit 110 produces the system power-control signal ES_AP with high level for turning on the power integrated device 100A.

Figure 10:
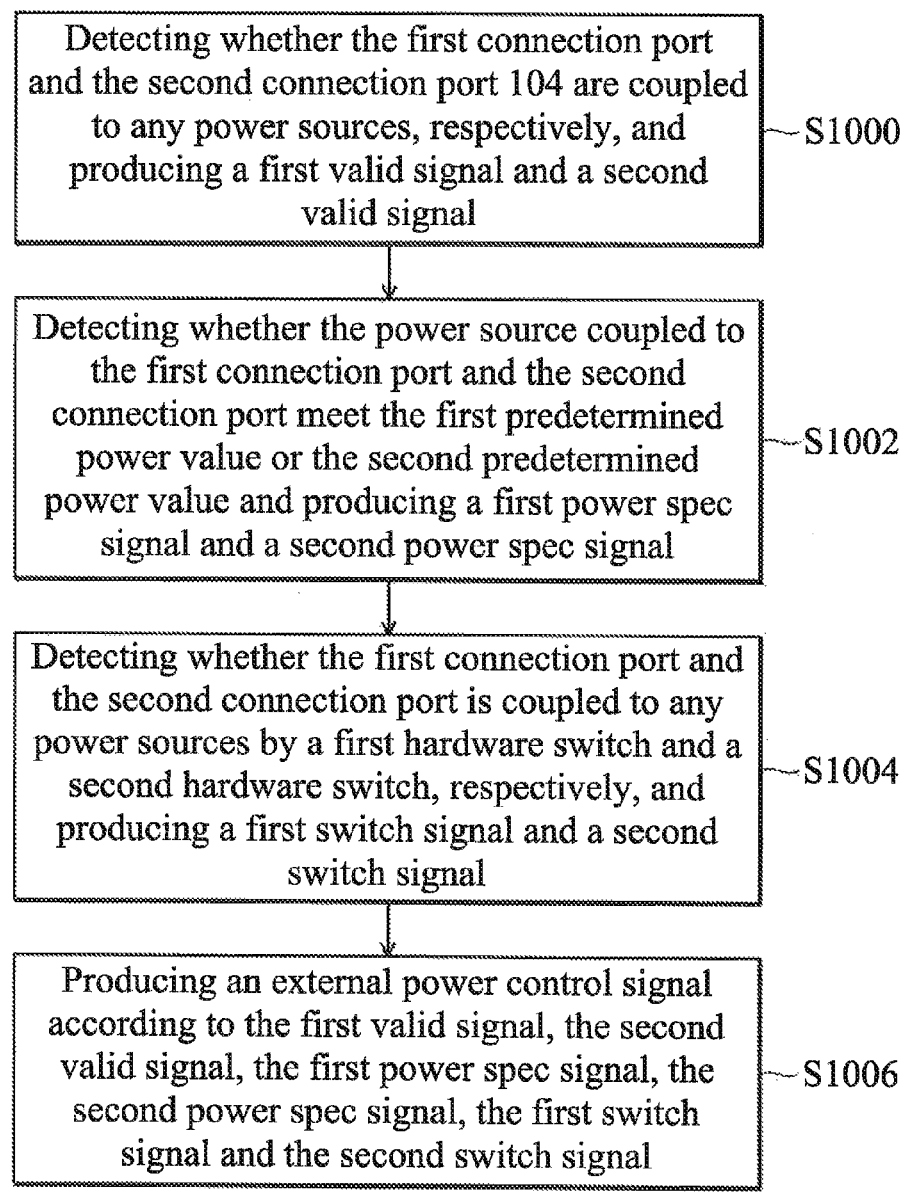
FIG. 10 is a flow chart illustrating another embodiment of the power source control method of the present invention.

FIG. 10 is a flow chart illustrating another embodiment of the power source control method of the present invention. The power source control method is applied to the power integrated device 100B. The process starts at step S1000. It should be noted that steps S1000-S1002 are similar to steps S900-S902, and the details of steps S1000-S1002 can be referred to in FIG. 9.

In step S1004, the first hardware switch 1022 of the first connection port 102 and the second hardware switch 1042 of the second connection port 104 are arranged to detect whether the first connection port 102 and the second connection port 104 are coupled to any power sources, respectively, and produce the first switch signal HW_S1 and the second switch signal HW_S2, accordingly. For example, when the first connection port 102 is coupled to a power source, the metal tab of the first hardware switch 1022 couples a signal line to the ground through the resistor to produce the first switch signal HW_S1 with low level. When the first connection port 102 is not coupled to any power sources, the metal tab of the first hardware switch 1022 couples the signal line to the high level through the resistor to produce the first switch signal HW_S1 with high level. When the second connection port 104 is coupled to a power source, the metal tab of the second hardware switch 1042 couples a signal line to the ground through the resistor to produce the second switch signal HW_S2 with low level. When the second connection port 104 is not coupled to any power sources, the metal tab of the second hardware switch 1042 couples the signal line to the high level through the resistor to produce the second switch signal HW_S2 with high level.

Next, in step S1006, the determination circuit 110 is further arranged to produce the external power-control signal ES_PSE according to the first valid signal SV1, the second valid signal SV2, the first power spec signal SA1, the second power spec signal SA2, the first switch signal HW_S1 and the second switch signal HW_S2 for turning on or off an external device 114. Specifically, when the first connection port 102 and the second connection port 104 are both coupled to the power sources meeting the first predetermined power value, the determination circuit 110 produces the external power-control signal ES_PSE with high level for turning on the external device 114. When either one of the first connection port 102 or the second connection port 104 is coupled to the power source meeting the first predetermined power value and the first connection port 102 or the second connection port 104 that is remaining is not coupled to any power sources, the determination circuit 110 produces the external power-control signal ES_PSE with low level for turning off the external device 114. When the first connection port 102 and the second connection port 104 are both coupled to the power sources meeting the second predetermined power value, the determination circuit 110 produces the external power-control signal ES_PSE with low level for turning off the external device 114. When either one of the first connection port 102 or the second connection port 104 is coupled to the power source meeting the second predetermined power value or the first connection port 102 and the second connection port 104 that is remaining is not coupled to any power sources, the determination circuit 110 produces the external power-control signal ES_PSE with low level for turning off the external device 114. When either one of the first connection port 102 or the second connection port 104 is coupled to the power source meeting the first predetermined power value and the first connection port 102 or the second connection port 104 that is remaining is coupled to the power source meeting the second predetermined power value, the determination circuit 110 produces the external power-control signal ES_PSE with high level for turning on the external device 114.

It should be noted that the power source control method of FIG. 9 can be performed with the power source control method of FIG. 10 simultaneously, but it is not limited thereto.

The power integrated device 100A/100B and the power source control method are capable of turning on or off the power integrated device 100A/100B and the external device 114 according to the receive power sources.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power integrated device, comprising:
   a first connection port;
   a second connection port;
   a detection circuit, arranged to detect whether the first connection port is coupled to a first power source with a first power value and the second connection port is coupled to a second power source with a second power value to produce a first valid signal and a second valid signal, respectively, wherein the detection circuit produces a first power spec signal with a first level when the first power value meets a first predetermined power value, produces the first power spec signal with a second level when the first power value meets a second predetermined power value, produces a second power spec signal with the first level when the second power value meets the first predetermined power value, and produces the second power spec signal with a second level when the second power value meets the second predetermined power value, wherein the first predetermined power value is greater than the second predetermined power value, the first power source is different from the second power source, and the first level is greater than the second level; and a determination circuit, arranged to produce a system power-control signal according to the first valid signal, the second valid signal, the first power spec signal and the second power spec signal to turn on or turn off the power integrated device.

2. The power integrated device as claimed in claim 1, wherein when the first power value and the second power value meet the first predetermined power value, the determination circuit produces a system power-control signal with high level for turning on the power integrated device;

when either one of the first power value or the second power value meets the first predetermined power value and the first connection port or the second connection port that is remaining is not coupled to any power sources, the determination circuit produce the system power-control signal with high level for turning on the power integrated device;

when the first power value and the second power value meet the second predetermined power value, the determination circuit produces the system power-control signal with high level for turning on the power integrated device;

when either one of the first power value or the second power value meets the second predetermined power value and the first connection port or the second connection port that is remaining is not coupled to any power sources, the determination circuit produces the system power-control signal with low level for turning off the power integrated device; and when either one of the first power value or the second power value meets the first predetermined power value and the first power value or the second power value that is remaining meets the second predetermined power value, the determination circuit produces the system power-control signal with high level for turning on the power integrated device.

3. The power integrated device as claimed in claim 2, wherein the determination circuit further comprises:

a first inverter, having an input terminal and an output terminal, wherein the input terminal of the first inverter is arranged to receive the first power spec signal;

a second inverter, having an input terminal and an output terminal, wherein the input terminal of the second inverter is arranged to receive the second power spec signal;

a NAND gate, having a first input terminal, a second input terminal, and an output terminal, wherein the first input terminal of the NAND gate is coupled to the output terminal of the first inverter, and the second input terminal of the NAND gate is coupled to the output terminal of the second inverter;

a XOR gate, having a first input terminal, a second input terminal and an output terminal, wherein the first input terminal of the XOR gate is arranged to receive the first valid signal, and the second input terminal of the XOR gate is arranged to receive the second valid signal;

a third inverter, having an input terminal and an output terminal, wherein the input terminal of the third inverter is coupled to the output terminal of the XOR gate; and a first OR gate, having a first input terminal, a second input terminal and an output terminal, wherein the first input terminal of the first OR gate is coupled to the output terminal of the NAND gate, the second input terminal of the first OR gate is coupled to the output terminal of the third inverter, and the output terminal of the first OR gate is arranged to output the system power-control signal.

4. The power integrated device as claimed in claim 2, wherein the determination circuit further comprises:

a XOR gate, having a first input terminal, a second input terminal and an output terminal, wherein the first input terminal of the XOR gate is arranged to receive the first valid signal, and the second input terminal of the XOR gate is arranged to receive the second valid signal;

a third inverter, having an input terminal and an output terminal, wherein the input terminal of the third inverter is coupled to the output terminal of the XOR gate; and a first OR gate, having a first input terminal, a second input terminal and an output terminal, wherein the second input terminal of the first OR gate is coupled to the third inverter, and the output terminal of the first OR gate is arranged to output the system power-control signal; and a second OR gate, having a first input terminal, a second input terminal and an output terminal, wherein the first input terminal of the second OR gate is arranged to receive the first power spec signal, the second input terminal of the second OR gate is arranged to receive the second power spec signal, and the output terminal of the second OR gate is coupled to the first input terminal of the first OR gate.

5. The power integrated device as claimed in claim 2, wherein the first connection port further comprises a first hardware switch arranged to detect whether the first connection port is coupled to the first power source and produce a first switch signal accordingly, and the second connection port further comprises a second hardware switch arranged to detect whether the second connection port is coupled to the second power source and produce a second switch signal accordingly.

6. The power integrated device as claimed in claim 5, wherein the determination circuit is further arranged to produce an external power-control signal according to the first valid signal, the second valid signal, the first power spec signal, the second power spec signal, the first switch signal and the second switch signal for turning on or off an external device.

7. The power integrated device as claimed in claim 6, wherein when the first power value and the second power value meet the first predetermined power value, the determination circuit produces the external power-control signal with high level for turning on the external device;

when either one of the first power value or the second power value meets the first predetermined power value and the first connection port or the second connection port that is remaining is not coupled to any power sources, the determination circuit produces the external power-control signal with low level for turning off the external device;

when the first power value and the second power value meet the second predetermined power value, the determination circuit produces the external power-control signal with low level for turning off the external device;

when either one of the first power value or the second power value meets the second predetermined power value or the first connection port and the second connection port that is remaining is not coupled to any power sources, the determination circuit produces the external power-control signal with low level for turning off the external device; and when either one of the first power value or the second power value meets the first predetermined power value and the first power value or the second power value that is remaining meets the second predetermined power value, the determination circuit produces the external power-control signal with high level for turning on the external device.

8. The power integrated device as claimed in claim 7, wherein the determination circuit further comprises:
   a first inverter, having an input terminal and an output terminal, wherein the input terminal of the first inverter is arranged to receive the first power spec signal;
   a second inverter, having an input terminal and an output terminal, wherein the input terminal of the second inverter is arranged to receive the second power spec signal;
   a NAND gate, having a first input terminal, a second input terminal and an output terminal, wherein the first input terminal of the NAND gate is coupled to the output terminal of the first inverter, and the second input terminal of the NAND gate is coupled to the output terminal of the second inverter;
   a XOR gate, having a first input terminal, a second input terminal and an output terminal, wherein the first input terminal of the XOR gate is arranged to receive the first valid signal, and the second input terminal of the XOR gate is arranged to receive the second valid signal;
   a third inverter, having an input terminal and an output terminal, wherein the input terminal of the third inverter is coupled to the output terminal of the XOR gate;
   a first OR gate, having a first input terminal, a second input terminal and an output terminal, wherein the first input terminal of the first OR gate is coupled to the output terminal of the NAND gate, the second input terminal of the first OR gate is coupled to the output terminal of the third inverter, and the output terminal of the first OR gate is arranged to output the system power-control signal;
   a second OR gate, having a first output terminal, a second input terminal and an output terminal, wherein the first output terminal of the second OR gate is coupled to the first power spec signal, and the second input terminal of the second OR gate is arranged to receive the second power spec signal;
   a first AND gate, having a first input terminal, a second input terminal, a third input terminal and an output terminal, wherein the first input terminal of the first AND gate is coupled to the output terminal of the second OR gate, the second input terminal of the first AND gate is arranged to receive the first valid signal, and the third input terminal of the first AND gate is arranged to receive the second valid signal;
   a NOR gate, having a first input terminal, a second input terminal and an output terminal, wherein the first input terminal of the NOR gate is arranged to receive the first switch signal, and the second input terminal of the NOR gate is arranged to receive the second switch signal; and
   a second AND gate, having a first input terminal, a second input terminal and an output terminal, wherein the first input terminal of the second AND gate is coupled to the output terminal of the first AND gate, the second input terminal of the second AND gate is coupled to the NOR gate, and the output terminal of the second AND gate is arranged to produce the external power-control signal.

9. The power integrated device as claimed in claim 7, wherein the determination circuit further comprises:
   a XOR gate, having a first input terminal, a second input terminal and an output terminal, wherein the first input terminal of the XOR gate is arranged to receive the first valid signal, and the second input terminal of the XOR gate is arranged to receive the second valid signal;
   a third inverter, having an input terminal and an output terminal, wherein the input terminal of the third inverter is coupled to the output terminal of the XOR gate; and
   a first OR gate, having a first input terminal, a second input terminal and an output terminal, wherein the second input terminal of the first OR gate is coupled to the output terminal of the third inverter, and the output terminal of the first OR gate is arranged to output the system power-control signal;
   a second OR gate, having a first input terminal, a second input terminal and an output terminal, wherein the first input terminal of the second OR gate is arranged to receive the first power spec signal, the second input terminal of the second OR gate is arranged to receive the second power spec signal, and the output terminal of the second OR gate is coupled to the first input terminal of the first OR gate;
   a first AND gate, having a first input terminal, a second input terminal, a third input terminal and an output terminal, wherein the first input terminal of the first AND gate is coupled to the output terminal of the second OR gate, the second input terminal of the first AND gate is arranged to receive the first valid signal, and the third input terminal of the first AND gate is arranged to receive the second valid signal;
   a NOR gate, having a first input terminal, a second input terminal and an output terminal, wherein the first input terminal of the NOR gate is arranged to receive the first switch signal, and the second input terminal of the NOR gate is arranged to receive the second switch signal; and
   a second AND gate, having a first input terminal, a second input terminal and an output terminal, wherein the first input terminal of the second AND gate is coupled to the output terminal of the first AND gate, the second input terminal of the second AND gate is coupled to the NOR gate, and the output terminal of the second AND gate is arranged to receive the external power-control signal.

10. A power source control method, applied to a power integrated device comprising a first connection port and a second connection port, and the power source control method comprising:
   detecting whether the first connection port is coupled to a first power source with a first power value and producing a first valid signal, accordingly;
   detecting whether the second connection port is coupled to a second power source with a second power value and producing a second valid signal, accordingly;

detecting whether the first power value meets a first predetermined power value or a second predetermined power value, producing a first power spec signal with a first level when the first power value meets the first predetermined power value, and producing the first power spec signal with a second level when the first power value meets the second predetermined power value, wherein the first predetermined power value is greater than the second predetermined power value, and the first level is greater than the second level;

detecting whether the second power value meets the first predetermined power value or the second predetermined power value, producing a second power spec signal with the first level when the second power value meets the first predetermined power value, and producing the second power spec signal with a second level when the second power value meets the second predetermined power value, wherein the first power source is different from the second power source, and the first level is greater than the second level; and producing a system power-control signal according to the first valid signal, the second valid signal, the first power spec signal and the second power spec signal for turning on or turning off the power integrated device.

11. The power source control method as claimed in claim 10, wherein the step of producing a system power-control signal for turning on or turning off the power integrated device further comprises:

producing a system power-control signal with high level for turning on the power integrated device when the first connection port and the second connection port are coupled to the power sources meeting the first predetermined power value;

producing the system power-control signal with high level for turning on the power integrated device when either one of the first power value or the second power value meets the first predetermined power value and the first connection port or the second connection port that is remaining is not coupled to any power sources;

producing the system power-control signal with high level for turning on the power integrated device when the first power value and the second power value meet the second predetermined power value;

producing the system power-control signal with low level for turning off the power integrated device when either one of the first power value or the second power value meets the second predetermined power value and the first connection port or the second connection port that is remaining is not coupled to any power sources; and producing the system power-control signal with high level for turning on the power integrated device when either one of the first power value or the second power value meets the first predetermined power value and the first power value or the second power value meets the second predetermined power value.

12. The power source control method as claimed in claim 10, further comprising:

detecting whether the first connection port is coupled to any power sources by a first hardware switch of the first connection port and producing a first switch signal accordingly; and detecting whether the second connection port is coupled to any power sources by a second hardware switch of the second connection port and producing a second switch signal, accordingly.

13. The power source control method as claimed in claim 12, further comprising producing an external power-control signal according to the first valid signal, the second valid signal, the first power spec signal, the second power spec signal, the first switch signal and the second switch signal for turning on or off an external device.

14. The power source control method as claimed in claim 12, wherein step of producing the external power-control signal for turning on or off the external device further comprises:

producing the external power-control signal with high level for turning on the external device when the first power value and the second power value meet the first predetermined power value;

producing the external power-control signal with low level for turning off the external device when either one of the first power value or the second power value meets the first predetermined power value and the first connection port or the second connection port that is remaining is not coupled to any power sources;

producing the external power-control signal with low level for turning off the external device when the first power value and the second power value meet the second predetermined power value;

producing the external power-control signal with low level for turning off the external device when either one of the first power value or the second power value meets the second predetermined power value or the first connection port and the second connection port that is remaining is not coupled to any power sources; and producing the external power-control signal with high level for turning on the external device when either one of the first power value or the second power value meets the first predetermined power value and the first power value or the second power value that is remaining meets the second predetermined power value.

* * * * *